US 6,747,991 B1

(12) United States Patent
Hemy et al.

(10) Patent No.: US 6,747,991 B1
(45) Date of Patent: Jun. 8, 2004

(54) FILTER AND METHOD FOR ADAPTIVELY MODIFYING THE BIT RATE OF SYNCHRONIZED VIDEO AND AUDIO STREAMS TO MEET PACKET-SWITCHED NETWORK BANDWIDTH CONSTRAINTS

(75) Inventors: Michael Hemy, Wexford, PA (US); Peter Steenkiste, Pittsburgh, PA (US); Thomas Gross, Pittsburgh, PA (US)

(73) Assignee: Carnegie Mellon University, Pittsburg, PA (US)

( * ) Notice: Subject to any disclaimer, the term of this patent is extended or adjusted under 35 U.S.C. 154(b) by 0 days.

(21) Appl. No.: 09/558,518

(22) Filed: Apr. 26, 2000

(51) Int. Cl.[7] .................................................. H04J 3/22
(52) U.S. Cl. ........................ 370/468; 370/236; 709/235
(58) Field of Search ................................ 370/229, 235, 370/235.1, 236, 464, 465, 468, 469, 473; 709/231, 232, 233, 235, 236

(56) References Cited

U.S. PATENT DOCUMENTS

| | | | |
|---|---|---|---|
| 5,854,658 A | * 12/1998 | Uz et al. ................ | 375/240.05 |
| 5,953,506 A | * 9/1999 | Kalra et al. .................. | 709/231 |
| 6,014,694 A | 1/2000 | Aharoni et al. ............. | 370/235 |
| 6,108,382 A | * 8/2000 | Gringeri et al. ........ | 375/240.01 |
| 6,412,013 B1 | * 6/2002 | Parthasarathy et al. ..... | 709/235 |

OTHER PUBLICATIONS

Mehaoua FEC–PSD: a FEC–aware video packet drop scheme. Global Telecommunications Conference, 1999. GLOBECOM '99, vol.: 4 , 1999, Page(s): 2091–2096 vol. 4.*

Amir et al., "A Layered DCT Coder for Internet Video," Proceedings of the IEEE International Conference on Image Processing, Laussane, Switzerland, Sep. 1996, pp. 13–16.

Kozen et al., "Efficient Algorithms for Optimal Video Transmission," Technical Report 95–1517, Computer Science Department, Cornell University, May 1995.

Amir et al., "An Active Service Framework and its Application to Real–time Multimedia Transcoding," Proceedings of ACM SIGCOMM '98, pp. 178–189, Vancouver, Canada, Sep. 1998.

Amir et al., "An Application Level Video Gateway," Proceedings of ACM Multimedia, Nov. 1995, San Francisco, CA.

Amir et al., "Receiver–driven Bandwidth Adaptation for Light–weight Sessions," Proceedings of ACM Multimedia, Nov. 1997, Seattle, WA.

Kozen et al., "Efficient Altorithms for Optimal Video Transmission," Data Compression Conference, Mar. 1998.

Fox et al., "Adapting to Network and Client Variability via On–Demand Dynamic Distillation," Proceedings of the Seventh International Conference on Architectural Support for Programming Languages and Operating System (ASPLOS–VII), Cambridge, MA, Oct. 1996.

* cited by examiner

Primary Examiner—Hassan Kizou
Assistant Examiner—Dmitry Levitan
(74) Attorney, Agent, or Firm—Kirkpatrick & Lockhart LLP

(57) ABSTRACT

A filter for adaptively modifying a bit rate of a synchronized video and audio stream transmitted over a packet-switched network, including a layer detection module, an adaptive frame removal module in communication with the layer detection module, and a network packetizing and pacing module in communication with the adaptive frame removal module.

40 Claims, 6 Drawing Sheets

US 6,747,991 B1

FILTER AND METHOD FOR ADAPTIVELY MODIFYING THE BIT RATE OF SYNCHRONIZED VIDEO AND AUDIO STREAMS TO MEET PACKET-SWITCHED NETWORK BANDWIDTH CONSTRAINTS

STATEMENT REGARDING FEDERALLY SPONSORED RESEARCH OR DEVELOPMENT

Certain of the research leading to the present invention was sponsored by the United States Defense Advanced Research Projects Agency (DARPA) under contract No. F30602-96-1-0287. The United States Government may have rights in the invention.

CROSS-REFERENCE TO RELATED APPLICATIONS

Not Applicable.

BACKGROUND OF INVENTION

1. Field of Invention

The present invention relates generally to packet-switched networks and, more particularly, to filters and methods for adaptively modifying the bit rate of synchronized video and audio streams distributed over such packet-switched networks.

2. Description of the Background

There are many formats used to encode movies (i.e., video and audio data) for transmission over networks of limited and varying bandwidth. For example, the MPEG (Motion Picture Experts Group) format is a widely accepted international standard for synchronously encoding video and audio data streams. MPEG-1, for example, was primarily designed for storing video data (moving pictures) and its associated audio data on digital storage media. As such, the MPEG standard deals with two aspects of encoding: compression and synchronization. MPEG specifies an algorithm for compressing video pictures (ISO-11172-2) and audio (ISO-11172-3) and then provides the facility to synchronize multiple audio and multiple video bitsreams (ISO-11172-1) in an MPEG system stream. MPEG-1 is intended for intermediate data rates on the order of 1.5 Mbit/sec.

An MPEG video stream distinguishes between different types of pictures, or frames, called I-frames, P-frames, and B-frames. These pictures differ in their coding schemes. The three types of coding provide three levels of compression by exploiting similarities within the picture or similarities to neighboring pictures. An MPEG-1 audio stream consists of audio coded using one of three algorithms, which offer different levels of complexity and subjective quality. These algorithms are referred as 'layers' in the coding standard. The coding algorithms use psycho-acoustic properties of the human hearing to compress the data (lossy compression). The MPEG system stream is responsible for combining one or more compressed audio and video bitstreams into a single bitstream. This is done by interleaving data from the video and audio streams, combined with meta-data that provides the time control and synchronization.

Distribution of encoded movies over a packet-switched network, such as the Internet, is a topic of great interest, but also poses a number of challenges. Because the movie is played as it is received, the transfer over the network must proceed at a specific rate to prevent buffer overflow or underflow at the player. If there is competing traffic in the network, however, there is always the risk of congestion, and consequently packets may be dropped or delayed. It is important to note that due to the high compression of video streams, dropped packets cause losses that are much higher than their proportionate size of the data streams, as discussed hereinbelow.

The infrastructure provided by today's IP-based networks provides access to a large number of nodes. Unfortunately, IPv4 (the current standard) provides no framework for resource reservation. Users are competing for bandwidth, and if a link becomes congested (demand for bandwidth is higher than the link capacity), packets are dropped. Because traffic conditions change continuously, congestion can start and disappear at any time. Note that in the current Internet, there is an assumption that it is the source's responsibility to reduce the data send rate when packet losses are observed to reduce congestion. For most applications, this reduction is done by TCP, the dominant Internet transport protocol.

Random packet losses can hurt MPEG system streams in two ways, besides the obvious fact that the information in the packets is lost. When the consequences of random packet losses are analyzed, it must be recognized that network packets may not correspond to MPEG packets, and the latter are a layer completely separate from the video frames. The amount of impact that the loss of a particular packet will have depends on its location in the stream and on the robustness of the player in recovering from errors. In the worst case, a network packet that contains meta-data of the whole MPEG stream (the MPEG system header) may be lost. As a result, players that rely solely on synchronization information found in the stream will be significantly impacted when such information is lost. In a typical scenario, it is most likely that a lost packet will contain some part of a video frame with meta-data (video being the predominant stream).

In the context of the MPEG layers, a network loss translates into a disruption in the system packet layer, and may result in concatenating parts from two different MPEG packets. This loss can induce corruption in the lower layers, e.g., corruption of the video or audio data. If video data has been affected, the frame is decoded incorrectly. An incorrect I-frame or P-frame propagates problems to all dependent frames and corrupts these as well. In the worst case, a whole group of pictures (GOP) may be lost, typically equivalent to half a second of video. For various MPEG streams, experiments have shown that a random loss of 1% of network packets can translate into as high as 10% damaged video frames. Similarly, it has been noticed that packet loss rates as low as 3% translated into frame error rates as high as 30%.

Accordingly, there exists a need for a manner to adapt the actual bandwidth requirements of an encoded movie data stream to the current conditions of the packet-switched network over which the encoded movie is being distributed. There further exists a need for such an adaptive manner to execute in real-time and without affecting the synchronization of the video and audio portions of the encoded movie.

BRIEF SUMMARY OF INVENTION

The present invention is directed to a filter for adaptively modifying the bit rate of a synchronized video and audio stream transmitted over a packet-switched network. According to one embodiment, the filter includes a layer detection module, an adaptive frame removal module in communication with the layer detection module, and a network packetizing and pacing module in communication with the adaptive frame removal module.

According to another embodiment, the present invention is directed to a method for adaptively modifying a bit rate of a synchronized video and audio stream in real-time, including analyzing bits of the stream to detect encoded video frames in a video layer of the stream, removing certain of the encoded video frames from the stream based on available network bandwidth, and packetizing the stream.

The present invention represents an advancement over the prior art in that it provides a manner in which to adapt the actual bandwidth requirements of an encoded movie data stream to the current conditions of the packet-switched network over which the encoded movie is being distributed. The present invention represents a further advancement over the prior art in that it operates in real-time because it does not require demultiplexing and/or decoding of the data stream. In addition, the present invention provides an advantage over the prior art because it modifies the data stream without corruption and without destroying the synchronization information. These and other benefits of the present invention will be apparent from the detailed description hereinbelow.

DESCRIPTION OF THE FIGURES

For the present invention to be clearly understood and readily practiced, the present invention will be described in conjunction with the following figures, wherein.

DETAILED DESCRIPTION OF THE INVENTION

Figure 1:
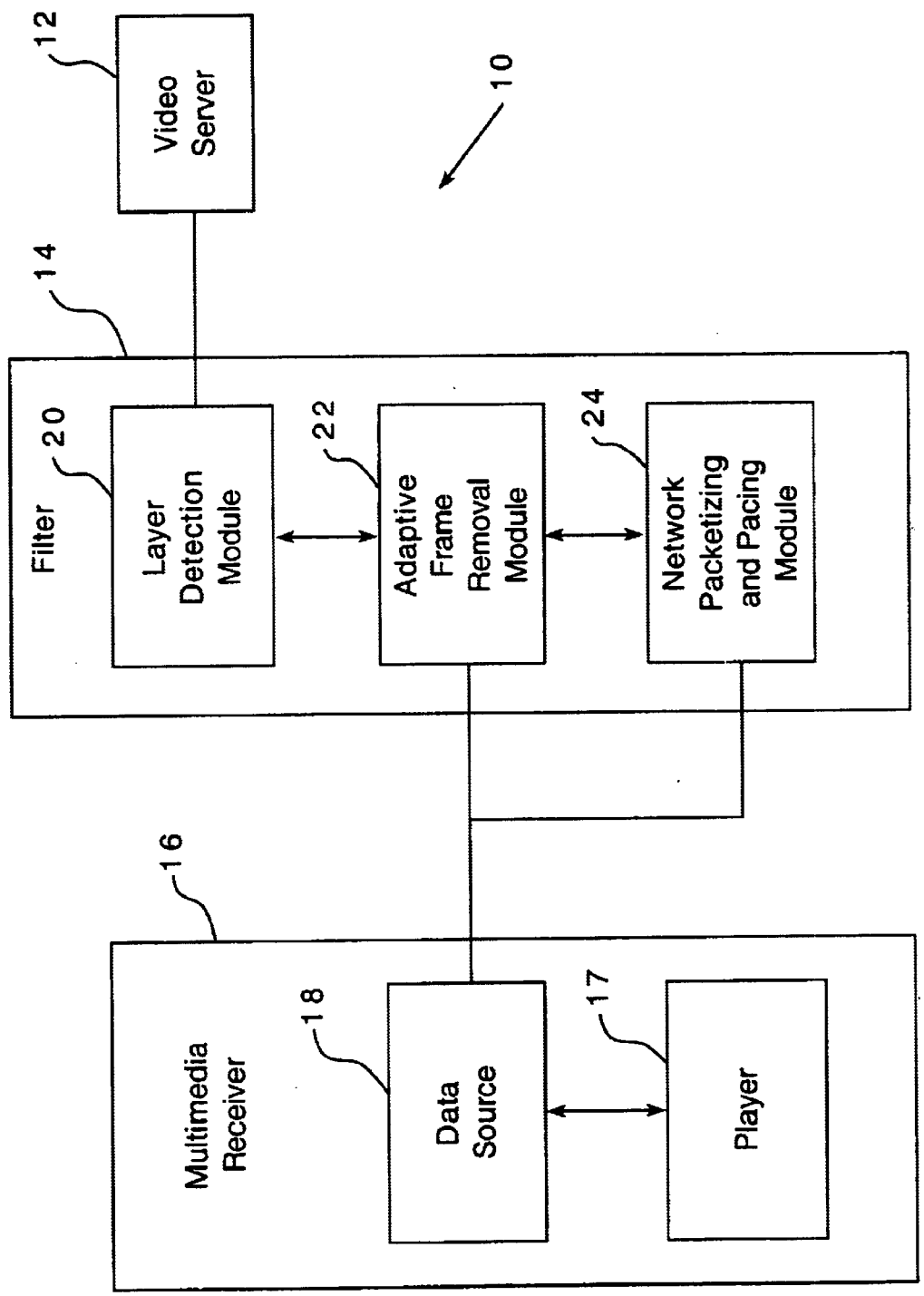
FIG. 1 is a block diagram of a packet-switched network according to one embodiment of the present invention.

It is to be understood that the figures and descriptions of the present invention have been simplified to illustrate elements that are relevant for a clear understanding of the present invention, while eliminating, for purposes of clarity, other elements of a packet-switched network. For example, certain operating system details and modules of certain of the intelligent platforms of the network are not described herein. Those of ordinary skill in the art will recognize, however, that these and other elements may be desirable in a typical packet-switched network. However, because such elements are well known in the art, and because they do not facilitate a better understanding of the present invention, a discussion of such elements is not provided herein.

According to one embodiment, the present invention is directed to a filter which adaptively modifies the resulting bit rate of synchronized video and audio streams transmitted from a video server to a client over a packet-switched network based on the current network bandwidth conditions. The present invention will be described herein as transmitting encoded video and audio system streams according to an MPEG (Motion Pictures Expert Group) format, although benefits of the present invention may be realized with other formats using video compression techniques.

MPEG compresses video pictures using DCT (Discrete Cosine Transform), and encodes the compressed video pictures using a hierarchical interceding technique which reduces the amount of data which must be transmitted by exploiting similarities within the picture or similarities between neighboring pictures. A typical MPEG video stream includes three types of frames: I-frames, P-frames, and B-frames. The I-frames are stand-alone frames, and as such include the most data. P-frames depend on I-frames, and include an interpolation of the difference between the P-frame and a reference I-frame. B-frames include the least amount of data, and depend upon both I- and P-frames, including a further interpolation of the difference between frames.

The structure of an MPEG video stream may include a number frames transmitted in one group of pictures (GOP). A typical sequence of frames for a GOP including fifteen frames may be as follows:

IBBPBBPBBPBBPBB

An identical sequence of frames may be utilized throughout the system stream to facilitate decoding at the receiver. Data packets of MPEG system streams may include video information, audio information, and synchronization information, the latter of which provides timing information for the video and audio data.

Typically if an underlying video or audio steam needs to be modified, the process requires demultiplexing the MPEG system stream, applying the filtering on the underlying stream, and remultiplexing according to the MPEG standard. MPEG multiplexing requires calculating various parameters (e.g., the presentation time stamps and the decoding time stamps of media units) to construct an MPEG system stream that allows a standard player to decode it on time.

On the other hand, the filter of the present invention removes data (i.e., frames) while maintaining the corresponding pairs of meta-data and media units (video or audio). The MPEG stream is analyzed to identify rate information, the system layers, the video layers, and the audio samples. Because the video sequence is broken into MPEG packets without considering frame boundaries, the filter maintains the state across all the MPEG layers simultaneously for all audio and video streams. When a beginning of a frame of a particular video stream is detected, the filter may check whether it should be dropped or forwarded, as described hereinbelow, according to the current filtering level. The filter may output MPEG packets containing only information that needs to be forwarded. Accordingly, there may be empty MPEG packets, and even empty GOPs, but keeping these empty (MPEG) packets provides the important benefit that synchronization is maintained, allowing the client to decode and render the stream correctly. Consequently, during this process, the only change that needs to be made to the MPEG packet layer is the adjustment of the MPEG packet length.

FIG. 1 is a block diagram of a packet-switched network 10 according to one embodiment in which the filter of the present invention may be incorporated. The network 10 may be, for example, a best-efforts network, such as the Internet, and may include, according to one embodiment, a video server 12, a filter 14 according to the present invention, and a multimedia receiver 16. These elements may be in communication by, for example, TCP/IP and UDP communication links.

Two open connections may be maintained between the multimedia receiver 16 and the filter 14, as well as between the filter 14 and the video server 12. Of the two connections, one may be a bidirectional control connection used to exchange control information, which may be based on, for example, TCP. The control connection may be used by the multimedia receiver 16 to request video clips and other information from the video server 12. These requests may be forwarded to the video server 12 through intermediate nodes (not shown) of the network 10. In addition, the control connection may be used to provide feedback from the multimedia receiver 16 to the filter 14 regarding the current network bandwidth conditions. That is, the multimedia receiver 16, as described further hereinbelow, may send to the filter 14 requests to increase or decrease the bit rate of the system stream. Based on this information, as described hereinbelow, the filter 14 may adaptively modify the bit rate of the system stream by removing certain of the video frames from the stream.

A second of the two connections between the elements of the network 10 may be a data connection used to transfer the synchronized video/audio streams. Data between the filter 14 and the multimedia receiver 16 may use, for example, a UDP (User Datagram Protocol) format. Data between the filter 14 and the video server 12 may use, for example, TCP.

The video server 12 is capable of transmitting compressed and encoded movies files (i.e., synchronized video and audio bit streams), such as according to, e.g., the MPEG format. The video server 12 may run on any platform including, for example, a Windows® NT server.

The multimedia receiver (client) 16 may execute on any device such as, for example, a personal computer, a laptop, or a workstation, capable of receiving, decoding, and playing encoded movies transmitted over any network 10 (wireless, DSL, satellite, etc.). The multimedia receiver 16 may use, for example, a Java® Media Framework (JMF) module, which supports the replay of audio and video streams in a browser or desktop environment. The multimedia receiver 16 may include a player 17 and a data source 18. The player 17 may be any engine which supports the replay the audio and/or video stream, and may be optimized for a particular platform. For example, the player 17 may use optimized native methods to deal with specific devices.

The data source 18 may retrieve the data, such as from the network 10, using any of a variety of possible protocols. The data source 18 may also accumulate statistics on the number of packets being lost or dropped by the network 10 at the client interface. In addition, as described further hereinbelow, the data source 18 may also receive information from the filter 14 over the control connection therebetween regarding the current frame removal rate of the filter 14. Based on this information, the data source 18 may send a request to the filter 14 over the control connection to increase or decrease the frame removal rate, to thereby satisfy the current network bandwidth requirements.

To decide whether the filter 14 should increase or decrease the frame removal rate, the data source 18 may continuously measure the current packet loss rate using a sliding window of length S packets. S may be on the order of, for example, 500. If the packet loss rate is higher than a threshold $\alpha$, the data source 18 may request that the filter 14 increase the frame removal rate. The value of $\alpha$ should be such that a packet loss rate of $\alpha$ still results in acceptable video quality. A second threshold $\beta(\beta<\alpha)$ may be used to determine when the frame removal rate should be reduced: if the packet drop rate is less than $\beta$, the data source 18 may request that the filter 14 decrease the frame removal rate. Using two thresholds may allow the bandwidth recovery to be less aggressive. This way the protocol may be more friendly to competing traffic. Note that the waiting time before the data source 18 finally issues a request to reduce the frame removal rate may be longer than the waiting before issuing a request to increase it. This behavior is somewhat similar to TCP's congestion control. That is, it reduces bandwidth more aggressively than it increases it. The thresholds $\alpha$ and $\beta$ may be set to, for example, 5% and 1% respectively.

After every request to increase or decrease the frame removal rate, the data source 18 may temporarily suspend measuring the packet loss rate until it is notified by the filter 14 that the removal rate change took place. This depends on the number of packets 'en route' and the frame being processed by the filter 14 when it receives the request to change the removal rate. To inform the data source 18 about the filter 14 response, the header of a data packet from the filter 14 may include the active removal rate of the filter 14, as discussed further hereinbelow.

Based on these requests from the data source 18, the filter 14 may adaptively modify the system streams received from the video server 12 to adjust the bit rate of the system stream to accommodate the current network bandwidth conditions. The filter 14 may modify the bit rate of the system stream in order that the data packets may be reliably transmitted to the multimedia receiver 16 over the network 10 without corruption of the system stream and without destroying the synchronization of the video and audio data. The filter 14 may modify the bit rate of the system stream, as described hereinbelow, by removing certain of the encoded video frames. The removal of certain of the video frames reduces the required bandwidth of the system stream, yet maintains the framing (i.e., synchronization) of the data packets. The removal of certain frames may result in a modest, although often acceptable, degradation of the video quality. As explained further hereinbelow, this modest degradation, however, does not come at the expense of having the network 10 dropping critical frames or synchronization information.

The filter 14 may be implemented using, for example, a computer, such as a workstation or a personal computer, a microprocessor, or an application specific integrated circuit (ASIC). The filter 14 may include a layer detection module 20, an adaptive frame removal module (AFRM) 22, and a network packetizing and pacing module (NPPM) 24. The modules 20, 22, 24 may be implemented as software code to be executed by the filter 14 using any suitable computer language type such as, for example, Java®. In addition, the software code of the modules 20, 22, 24 may use, for example, conventional or object-oriented programming techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM. According to another embodiment, the filter 14 may be co-located with the video server 12. That is, the modules 20, 22, 24 of the filter 14 may be executed by a processing unit of the video server 12.

The layer detection module 20 receives the synchronized video and audio stream from the video server 12 and analyzes the bit stream to detect the layers of the stream and, as a result, detects video frames in the stream. According to one embodiment, the layer detection module 20 analyzes the bit stream received from the video server 12 and looks at the sequence of bits to identify patterns according to the format definition of the particular encoding scheme (e.g., MPEG). Based on the identified patterns, the layer detection module 20 may build, and continuously update, a state machine to recognize the current position in the stream relative to all the layers (e.g., system, video, and audio layers). Having recognized the various layers, including the video layer, the layer detection module 20 can detect the beginnings of the encoded video frames. For example, for an MPEG system stream, the layer detection module 20 may detect the beginning of the I-, P-, and B-frames by analyzing the bits of the MPEG system stream. Accordingly, the layer detection module 20 need not demultiplex nor decode the stream received from the video server 12. As a result, the computationally cumbersome tasks of demultiplexing and decoding the bit stream are avoided with the filter 14 of the present invention.

The adaptive frame removal module (AFRM) 22 receives the requests from the data source 18 of the multimedia receiver 16 regarding whether the frame removal rate of the filter 14 should be increased or decreased. Based on this information, the AFRM 22 may remove certain of the encoded video frames from the stream to reduce the bit rate to accommodate current network bandwidth conditions.

Typically, each frame of a video stream gets the same amount of playing time, and thus each is equally important. However, because of typical hierarchical interceding framing techniques, there may be a significant difference in both the size and information content of each of the encoded frames. Consequently, according to one embodiment of the present invention, the AFRM 22 first removes certain of the most interdependent frame types. That is, for example, for an embodiment in which the network 10 is transmitting MPEG system streams, the AFRM 22 may first remove B-frames as needed to reduce the bit rate. Additionally, to provide a "smooth" video stream despite the removal of certain frames, the AFRM 22 may distribute the removed frames as evenly as possible throughout the frame sequence, although the precise placement of the different frame types may restrict what frames can be removed at each reduction level.

For example, for an MPEG frame sequence of,

IBBBPBBBPBBBPBBBPBBB, the AFRM 22 may first seek to reduce the bit rate by removing only the middle B-frame from each contiguous group of three B-frames, resulting in a frame sequence of,

IBBPBBPBBPBBPBB.

If this is not a sufficient reduction in the bit rate, the AFRM 22 may next seek to reduce the bit rate by removing equally-spaced B-frames, yielding a frame sequence of:

IBPBPBPBPB.

Again, if the resulting bit rate is still not sufficient, the AFRM 22 may next remove all of the B-frames, resulting in a frame sequence of:

IPPPP.

If the first level of frame reduction (i.e., the removal of the lowest order frames in the hierarchy) does not reduce the data bit rate sufficiently to accommodate network conditions, the AFRM 22 may next remove certain of the next-lowest order of frames in the hierarchy. Thus, for example, for an MPEG system stream, certain of the P-frames may be removed as needed. According to one embodiment, the last intermediate frame immediately prior to the stand-alone frame of the next sequence of frames may be removed to reduce the bit rate. That is, for an MPEG stream sequence of:

IPPPP, the fourth P-frame may be removed. To further reduce the bit rate if necessary, the progression of removing the last P-frame may be repeated until all of the P-frames are removed.

This progression of removing higher-order frames in the hierarchy may be repeated as necessary for all of the types of frames, including the stand-alone frames if necessary, to produce a bit rate suitable for the current network conditions. Thus, again with reference to an MPEG system stream, if removal of all of the B- and P-frames still does not yield an acceptable bit rate, the AFRM 22 may then remove certain of the I-frames. At this point, however, the quality of the video may degrade significantly.

Once the system stream has been modified by the AFRM 22, the network packetizing and pacing module (NPPM) 24 packetizes the modified system stream in a format suitable for transmission over the network 10. According to one embodiment, the NPPM 24 uses a UDP format. In the header of each of the packets, the NPPM 24 may include a sequence number for the particular packet. In addition, the current frame removal rate of the AFRM 22 may be included in the packet header, as described hereinbefore.

The NPPM 24 may send each packet to the multimedia receiver 16 over the data connection at the same rate that a corresponding data packet from a non-filtered system stream would have been sent. The NPPM 24 may know the bandwidth requirements of the movie being transmitted to the multimedia receiver 16 from the headers in the bit stream received by the filter 14 from the video server. Moreover, after modification of the bit stream by the AFRM 22, the NPPM 24 may know the resulting bit rate of the modified stream. Based on this, the NPPM 24 may pace the transmission of the packets to the multimedia receiver 16 to correspond to the movie requirements. In addition, the NPPM 24 may distribute the network packets over the interval created by removal of the frames to smooth the network traffic by eliminating burstiness. Consequently, the resulting traffic is less prone to suffer packet loss over a congested network.

Figure 2:
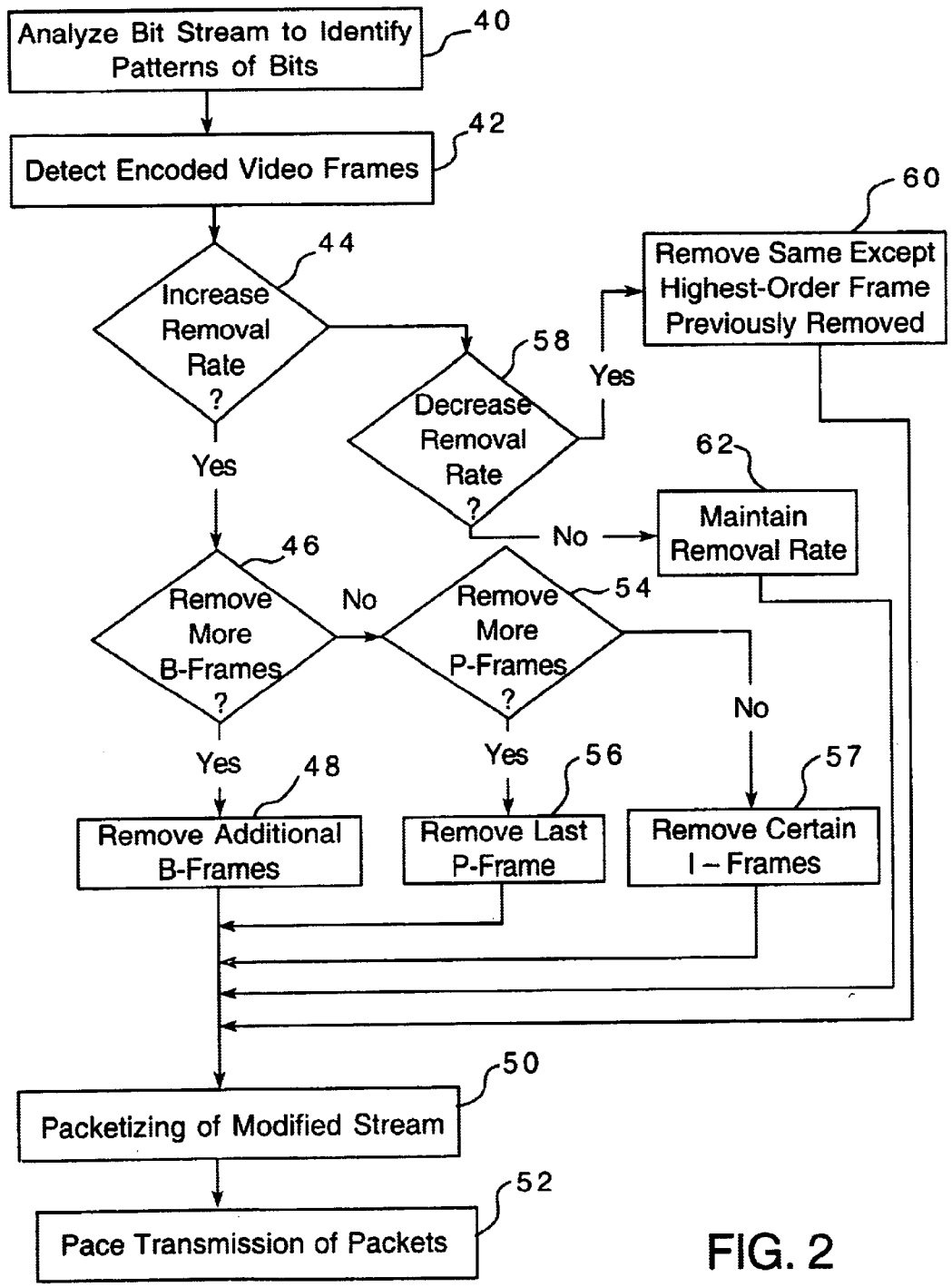
FIG. 2 is a block diagram of the process flow through the filter of the network of FIG. 1 according to one embodiment of the invention.

FIG. 2 is a block diagram of the process flow through the filter 14 according to one embodiment of the invention. The process flow of FIG. 2 will be described with reference to a network 10 transmitting MPEG system streams although, as discussed hereinbefore, benefits of the present invention may be realized with other types of video compression techniques.

The process begins at block 40, where the filter 14 analyzes the bit stream for the encoded movie received from the video server 12 to identify patterns of bits, which are used to recognize the current position in the stream relative to all the layers, as discussed hereinbefore. From block 40, the process advances to block 42, where, based on the ability to recognize the current position in the stream relative to the other layers, the beginnings of the encoded video frames are detected. For example, for an MPEG system stream, the beginnings of the I-, P-, and B-frames are detected based on the analysis of the bit stream.

From block 42, the process continues to block 44, where it is determined whether the frame removal rate of the filter 14 should be increased. This determination may be provided from a request from the data source 18 of the multimedia receiver 16, as described hereinbefore. If it is determined that the frame removal rate should be increased, the process advances to block 46, where it is determined whether, based on the current frame removal rate, there are additional B-frames (i.e., the lowest-order frames in the hierarchical interceding scheme) to be removed.

If at block 46 it is determined that not all of the B-frames are currently being removed, the process may continue to block 48, where the AFRM 22 removes additional B-frames of the MPEG sequence. For example, if previously the AFRM 22 was removing one of every three contiguous B-frames, at block 36 the AFRM 22 may commence removing two of every three B-frames. Alternatively, if previously the AFRM 22 was removing two of every three contiguous B-frames, the AFRM 22 may commence removing all three of the B-frames.

From block 48, the process flow continues to block 50, where the NPPM 24 packetizes the modified system stream, as described hereinbefore. From block 50, the process advances to block 52, where the NPPM 24 paces the transmission of the packets over the network 10 to correspond to the bandwidth requirements of the movie.

Returning to block 46, if it determined that all of the B-frames are currently being removed, the process advances to block 54, where it is determined whether any P-frames in the MPEG sequences may be removed. If so, the process advances to block 56, where the AFRM 22 may remove the last unremoved P-frame in the sequence. From block 56, the process advances to block 50, where the NPPM 24 packetizes the modified system stream.

Conversely, if at block 54 it is determined that all the P-frames are currently being removed, the process advances to block 57 where certain I-frames of the MPEG system stream are removed. To maximize the "smoothness" of the video, the AFRM 22 may remove evenly distributed I-frames. From block 57, the process advances to block 50, where the system stream is packetized.

Returning to block 44, if it is determined that the removal rate of the filter 14 should not be increased, the process flow advances to block 58, where it is determined whether the frame removal rate should be decreased. This determination may be made based on a request from the data source 18 of the multimedia receiver 16, as discussed hereinbefore.

If at block 58 it is determined that the frame removal rate should be decreased, the process advances to block 60, where the AFRM 22 removes the same frames that were being previously removed, except for certain of the highest-order frames previously removed. For example, if the AFRM 22 was previously removing every other I-frame, the AFRM 22 may commence removing only the P-, and B-frames. Further, if the AFRM 22 was previously removing two P-frames of every sequence, it may commence removing only one P-frame; and if it was previously removing only one P-frame, it may commence removing only B-frames. Similarly, if the AFRM 22 was removing every B-frame, it may commence removing only two of every three B-frames, and so forth. From block 60, the process flow advances to block 50, where the system stream is packetized.

Conversely, if at block 58 it is determined that the frame removal rate should not be decreased, the process flow advances to block 62, where the current frame removal rate is maintained. From block 62, the process advances to block 50, where the system stream is packetized.

Figure 3:
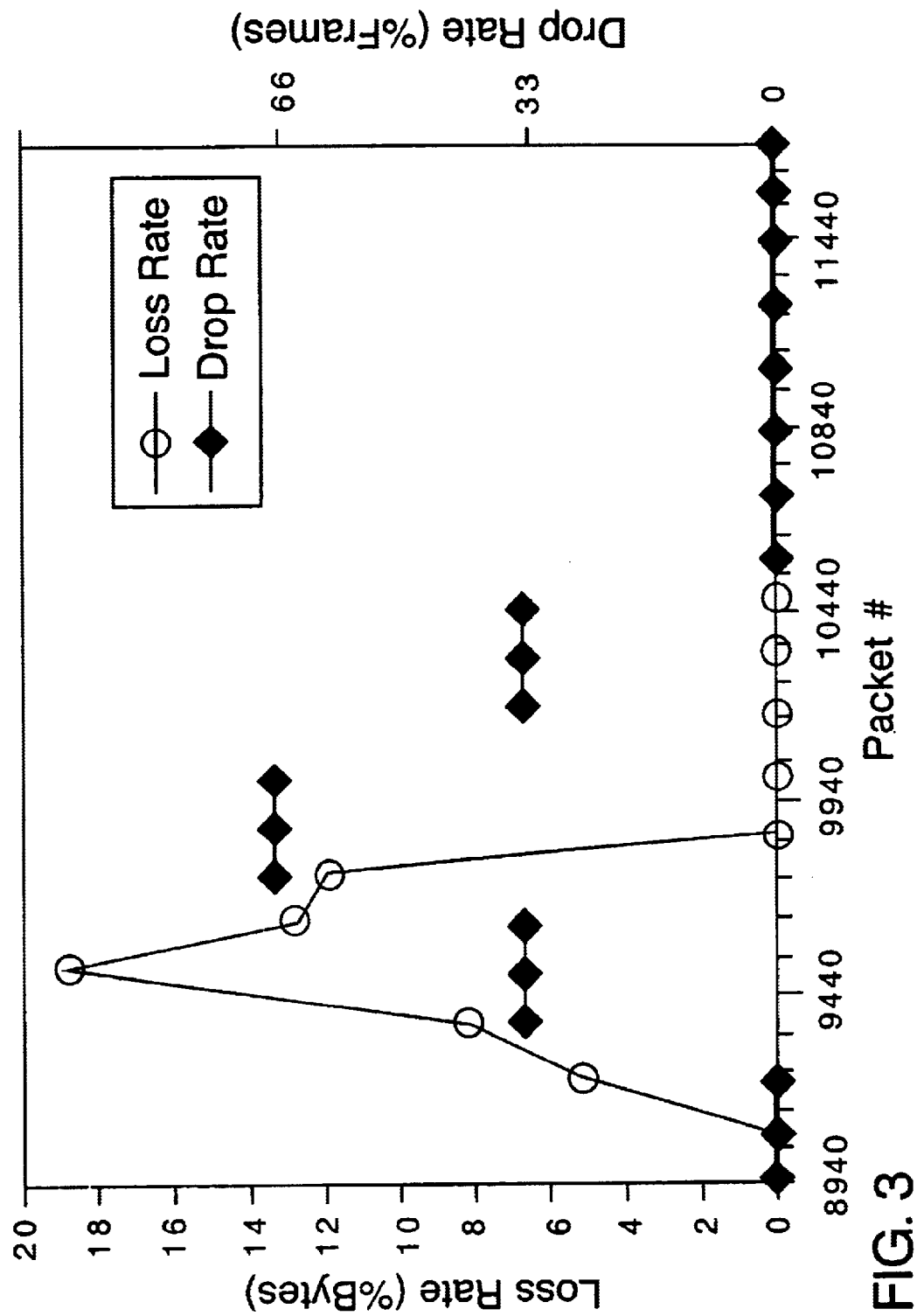
FIG. 3 is a graph illustrating the effect of the adaptive frame removal process of the present invention in response to a variable network load.

FIG. 3 is a graph illustrating the adaptive frame removal functionality of the filter 14 of the present invention in response to changing network bandwidth requirements. The data depicted in FIG. 3 was generated experimentally using a video server 12 having a 400 MHz Pentium II® processor with 264 Mbytes of RAM, and a multimedia receiver 16 having a 200 MHz Pentium Pro® processor with 64 Mbytes of RAM. The video server 12 and the multimedia receiver 16 were connected via a link that was loaded by a traffic generator to cause congestion for the server/client connection. In addition, the modules of the filter 14 were executed by the video server 12.

The graph of FIG. 3 shows that until receiving packet no. 9084, no packets had been lost, and that during the receipt of packets 9084 to 9214 by the multimedia receiver 16, 4.94% of the bytes were lost. As can be seen, in response to this network congestion, the filter 14 responded by removing 33% of the frames. As the loss rate continued to increase, the filter 14 responded by removing 66% of the frames. Eventually the removal of frames was too aggressive, and the filter 14 responded by removing fewer frames (33%), and then no frames after the packet loss rate returned to zero.

Figure 4:
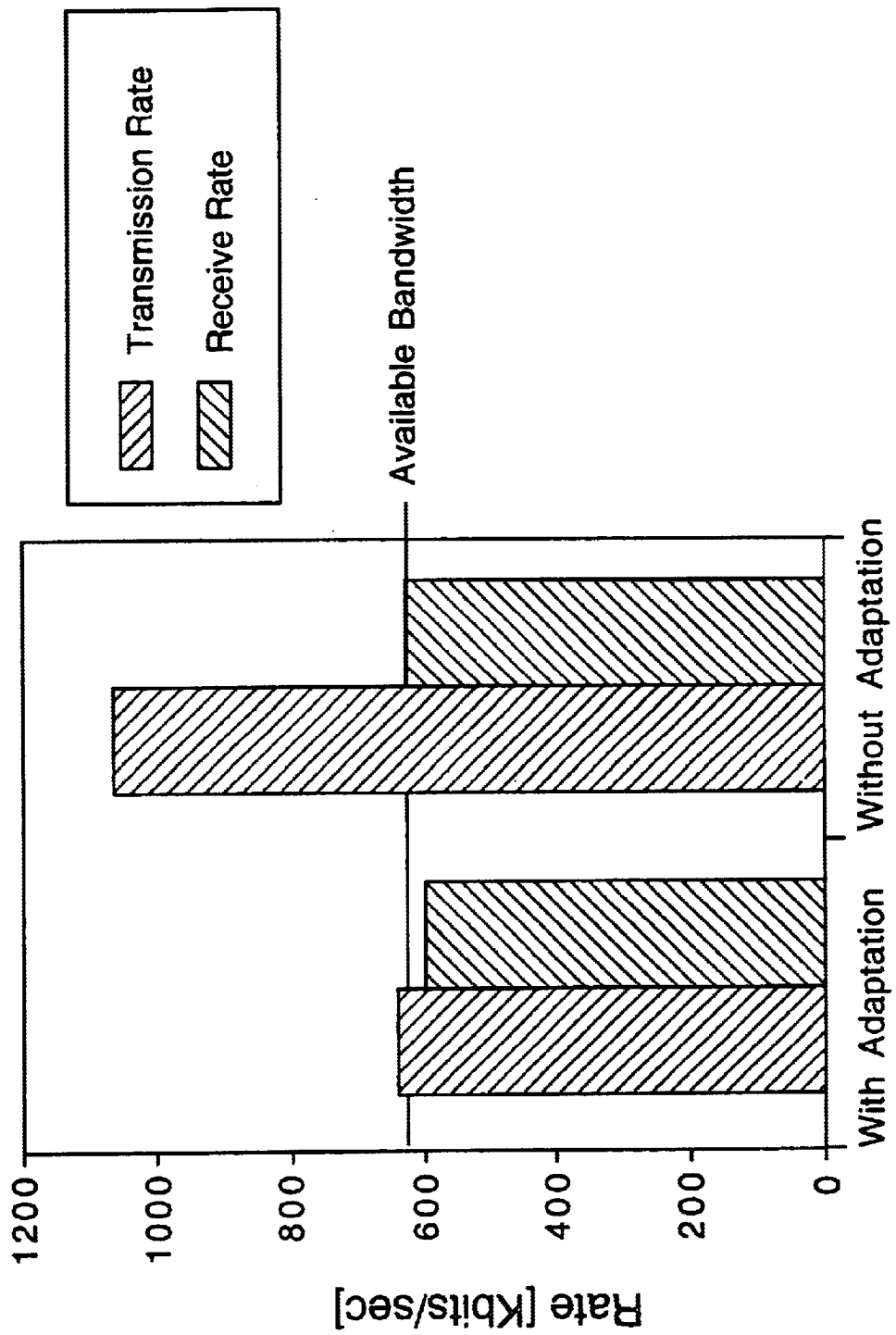
FIGS. 4–7 are bar graphs illustrating the advantages of using adaptation according to the present invention.

FIG. 4 is a bar graph illustrating the effectiveness of using the adaptive filter 14 of present invention versus a network without adaptation. The data of FIG. 4 was generated with a video server 12 and a multimedia receiver 16 having the same properties as described hereinbefore with respect to FIG. 3, and with the filter 14 co-located with the video server 12. The video server 12/filter 14 and the multimedia receiver 16 were connected via a network 10 having three segments: a local area network (LAN) network connecting to a T1 line, the T1 to the central office of the local telephone company, and a synchronous DSL line from the central office to the multimedia receiver 16. For this type of network 10, the DSL segment was the critical link because its maximum UDP throughput was measured at 649 Mbit/sec. Approximately 95% of this maximum bandwidth was available for the connection between the filter 14 and the multimedia receiver 16.

To measure the effectiveness of the filter 14 of the present invention, a number of MPEG-1 movies, each having a bandwidth requirement of 1.07 Mbits/sec, was transmitted from the video server 12 to the multimedia receiver 16 for a network including the filter 14 of the present invention and for a network without adaptation. FIG. 4 depicts the average transmission rate (measured at the sender) and the average receive rate (measured at the multimedia receiver (client) 18). With adaptation, the average transmission rate from the sender (i.e., the filter 14) remains close to the maximum bandwidth for the critical link. Without adaptation, the transmission rate from the sender (i.e., the video server 12 without a filter 14) is unconstrained because the video server 12 is connected to the LAN, but a large portion of the data is dropped by the network 10 along the way to the multimedia receiver 16. FIG. 4 shows that without adaptation, these dropped packets damage more frames than are suppressed by adaptation because of the hierarchical manner in which frames are removed with the present invention, so that the actual movie quality is significantly lower without adaptation.

Figures 5, 6, 7:
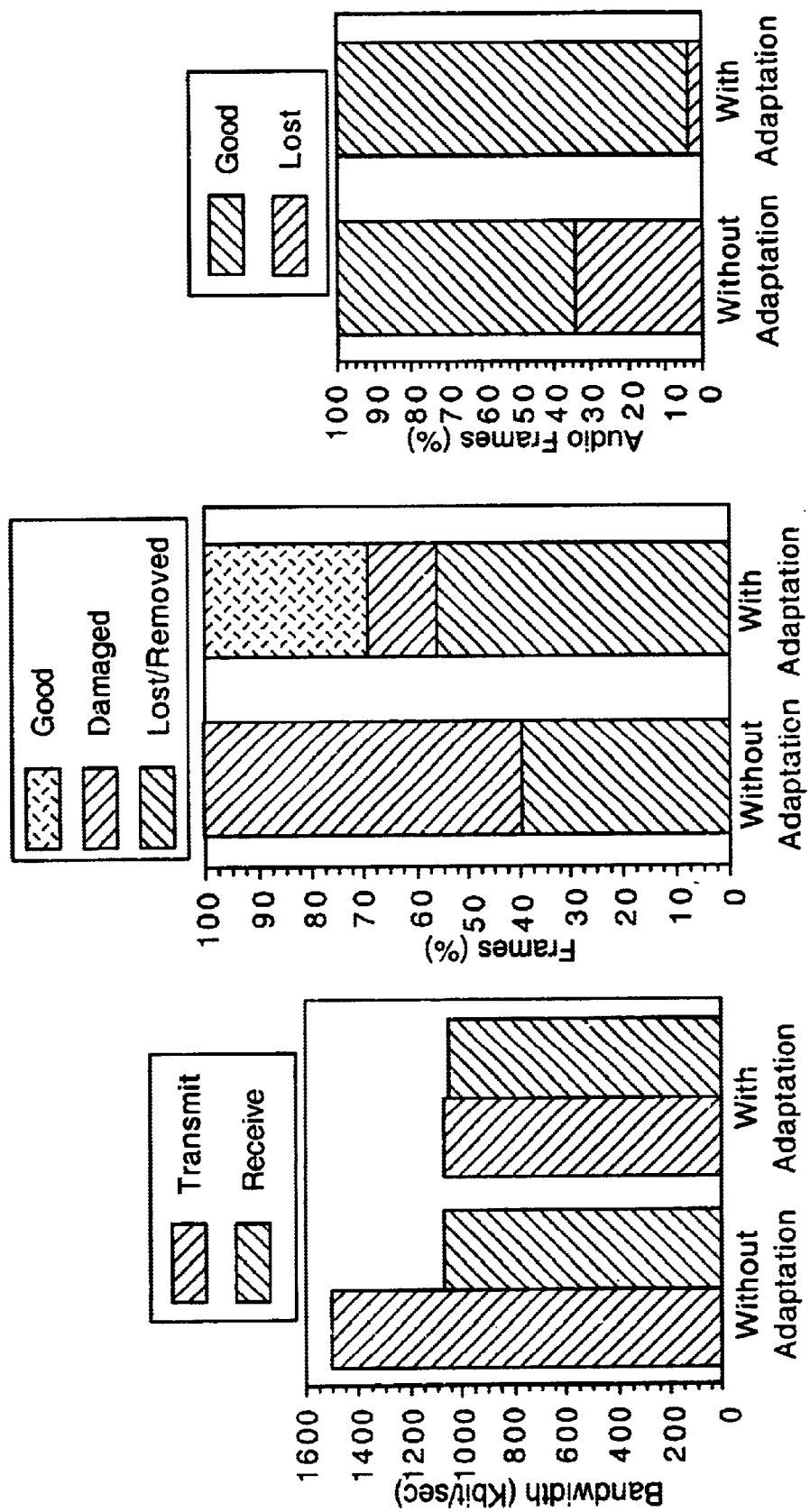

FIGS. 5–7 are additional bar graphs demonstrating the advantages of adaptation with the filter 14 of the present invention. The bar graph of FIG. 5 shows the transmit and receive throughputs for a 1.5 Mbit/sec movie with a bottleneck link bandwidth of 1.1 Mbit/sec with and without adaptation according to the present invention. As described hereinbefore, without adaptation, the receive rate at the client is modestly higher than with adaptation. The ramifications, however, of losing random packets of data without adaptation are shown with respect to FIGS. 6 and 7.

FIG. 6 is a bar graph showing the distribution of good, lost/dropped, and damaged frames with and without adaptation. For this figure, a frame is considered damaged if it cannot be decoded because it depends on another frame that was lost. As can be seen in FIG. 6, without adaptation, the loss of approximately 40% results in only approximately 1% of the frames being decodable by the client. This likely represents an unacceptable viewing experience for the end-user. However, with adaptation, the removal of approximately 55% of the frames results in approximately 30% of the frames being decodable at the client, which is, under most circumstances, acceptable. FIG. 7 is a bar graph showing the distribution of good and lost audio frames with and without adaptation. Again, as can be seen in FIG. 7, using the filter 14 of the present invention results in significantly more audio frames being decodable at the multimedia receiver (client) 18.

Figure 8:
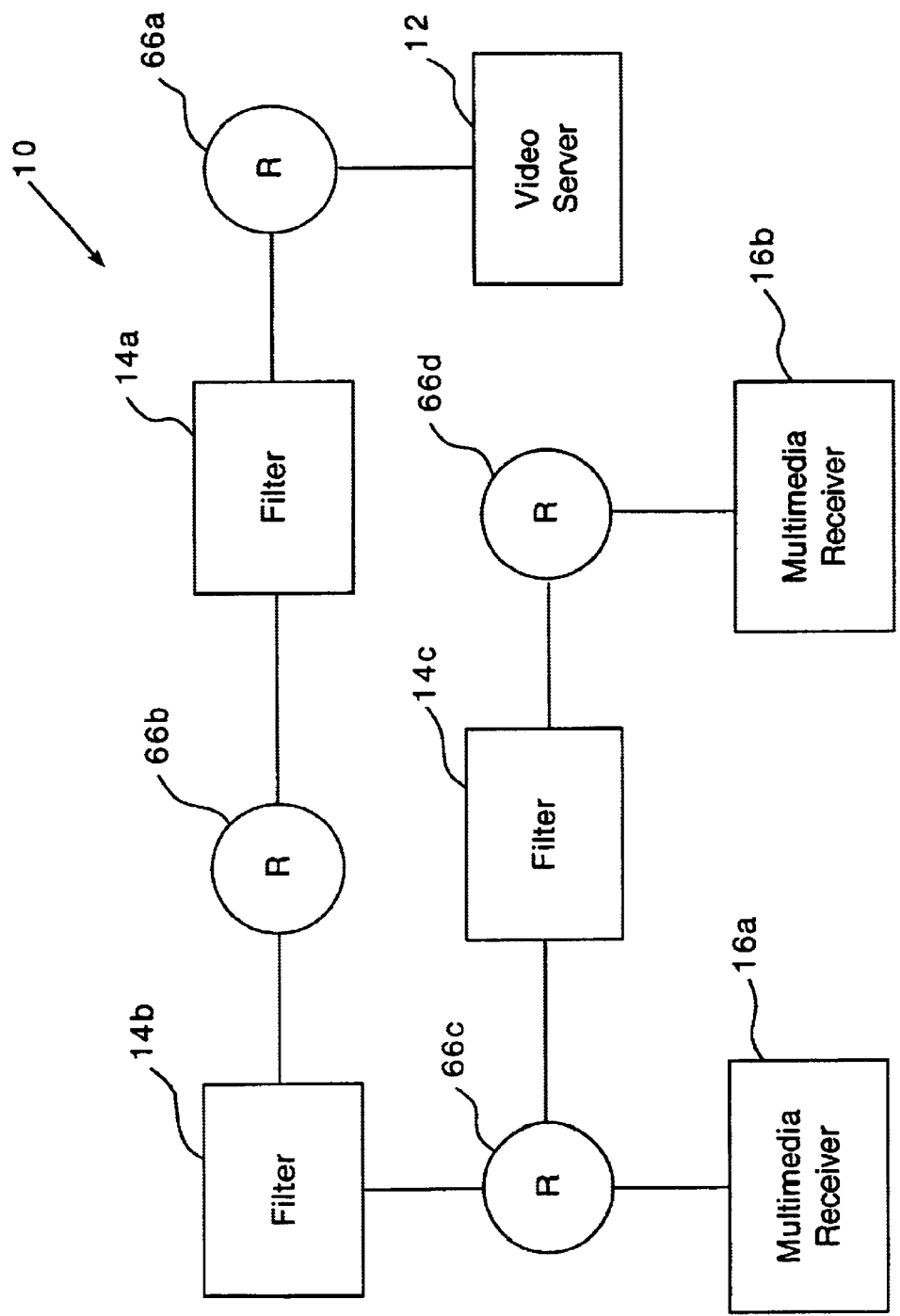
FIG. 8 is a block diagram of a packet-switched network according to another embodiment of the present invention.

FIG. 8 is a block diagram of the packet-switched network 10 according to another embodiment of the present invention. The network 10 is similar to that of FIG. 1, except that it includes a number of filters 14a–c and a number of multimedia receivers 16a–b. The video server 12, the filters 14, and the multimedia receivers 16 are connected by a number of routers 66a–d. The routers 66 may forward data packets between the devices based on routing tables and routing protocols, as is known in the art. The routers 66 may read the network address in each transmitted frame of the data packets and make a decision on how to send it based on the most expedient route (traffic load, line costs, speed, bad lines, etc.).

For an embodiment in which the network 10 includes a number of nodes, such as in the network 10 illustrated in FIG. 5, the filter 14a may be located in the network 10 such that data packets from the video server 12 are not dropped by the network 10 before they reach the filter 14a. In addition, with a cascaded configuration of the filters 14 as in the network 10 of FIG. 8, the filters 14 may provide feedback to each other regarding the packet loss rate between different links in the network 10. For example, the filter 14c could provide information to the filter 14b regarding the number of network packets being dropped at the router 66c. Accordingly, the filter 14b may modify the bit stream to be provided to the multimedia receiver 16b to accommodate the network bandwidth conditions for the link between the filter 14b and 14c.

The present invention thus provides a process for filtering complex synchronized audio and video streams that are highly compressed, such as MPEG, in a very efficient way, using a state machine rather that a demultiplexer and a decoder. The efficiency of the process makes the filtering very attractive for use in real-time streaming because it does not introduce latencies (or introduces very negligible latencies). In addition, the efficiency marked by utilizing a relatively low processor power (because of the obviation of the need to demultiplex and decode the data streams) makes the present invention attractive for simultaneous handling of multiple streams, such as is the case for transmission over the Internet.

The filtering process of the present invention may be further enhanced by combining it with a process for measuring the network conditions as seen by an end-user, and using this feedback to adaptively filter the data stream such as to create a stream which may be transmitted over the network with minimum corruption while being "friendly" to other applications using the same network segment. Thus, the present invention provides continuous adaptively that responds to network condition without the streaming process in a TCP-like friendliness, but without introducing delays or latencies.

In addition, as discussed hereinbefore, the present invention allows for cascading of the filtering and adaptivity functionality, or the connection of multiple filters 14 in series, each responsible for only one segment of the network, thus allowing an infrastructure to be built for distributing multimedia content (or movies) over large-scale wide-area-networks (WANs), with limited or varying bandwidth available.

Although the present invention has been described herein with respect to certain embodiments, those of ordinary skill in the art will recognize that many modifications and variations of the present invention may be implemented. For example, although the present invention was described primarily with reference to an MPEG format, benefits of the present invention may be realized with other types of video compression techniques. The foregoing description and the following claims are intended to cover all such modifications and variations.

What is claimed is:

1. A filter for adaptively modifying a bit rate of a synchronized video and audio stream transmitted over a packet-switched network to a receiver, comprising:
    a layer detection module for detecting encoded video frames in the stream;
    an adaptive frame removal module in communication with the layer detection module for removing certain of the encoded video frames based on a bandwidth condition of the network; and
    a network packetizing and pacing module in communication with the adaptive frame removal module for packetizing the modified stream into network packets and for pacing transmission of the packets of the modified stream over the network, wherein one of the packets includes information regarding the frame removal rate of the adaptive frame removal module.

2. The filter of claim 1, wherein the layer detection module is for detecting encoded video frames in the stream by detecting a structure of all layers of the stream without demultiplexing and decoding of the stream.

3. The filter of claim 1, wherein the network packetizing and placing module is for distributing network packets over an interval created by removal of the encoded video frames.

4. The filter of claim 1, wherein the layer detection module is for detecting encoded video frames by analyzing bits in the stream to identify patterns indicative of a current position in the stream relative to other layers in the stream.

5. The filter of claim 1, wherein the encoded video frames are encoded according to a hierarchy.

6. The filter of claim 5, wherein the adaptive frame removal module is for adaptively removing encoded video frames having an increasingly higher order in the hierarchy based on a bandwidth condition of the network.

7. The filter of claim 1, wherein the layer detection module is for detecting I-frames, P-frames, and B-frames in an MPEG system stream.

8. The filter of claim 7, where the adaptive frame removal module is for progressively removing, in order, B-frames, P-frames, and I-frames, based on a bandwidth condition of the network.

9. A filter for adaptively modifying a bit rate of a synchronized video and audio stream transmitted over a packet-switched network, comprising:
    means for detecting encoded video frames of the stream;
    means for adaptively removing certain of the encoded video frames based on a bandwidth condition of the network; and
    means for packetizing the stream into network packets, wherein one of the packets includes information regarding the frame removal rate of the means for adaptively removing certain of the encoded video frames.

10. The filter of claim 9, further comprising means for pacing transmission of the network packets over the network.

11. The filter of claim 9, wherein the means for pacing includes means for distributing network packets over an interval created by removal of the encoded video frames.

12. The filter of claim 9, wherein the means for detecting includes means for detecting I-frames, P-frames, and B-frames in an MPEG system stream.

13. The filter of claim 9, wherein the means for detecting includes means for detecting encoded video frames in the stream by detecting a structure of all layers of the stream without demultiplexing and decoding of the stream.

14. The filter of claim 9, wherein the encoded video frames are encoded according to a hierarchy, and wherein the means for adaptively removing includes means for progressively removing encoded video frames of an increasingly higher order in the hierarchy.

15. The filter of claim 9, wherein the bandwidth condition is communicated to the filter over the network.

16. A filter for a packet-switched network, comprising:
a layer detection module for detecting encoded video frames in a synchronized video and audio stream;
an adaptive frame removal module in communication with the decoding module for removing certain of the encoded video frames in the stream based on a bandwidth condition of the network; and
a network packetizing and pacing module in communication with the adaptive frame removal module for packetizing the stream into network packets and for pacing transmission of the packets over the network, wherein one of the packets includes information regarding the frame removal rate of the adaptive frame removal module.

17. The filter of claim 16, wherein the bandwidth condition is communicated to the adaptive frame removal module over the network.

18. The filter of claim 16, wherein the layer detection module is for detecting encoded video frames in the stream by detecting a structure of all layers of the stream without demultiplexing and decoding of the stream.

19. The filter of claim 16, wherein the layer detection module is for detecting encoded video frames by analyzing bits in the stream to identify patterns indicative of a current position in the stream relative to other layers in the stream.

20. The filter of claim 16, wherein the network packetizing and pacing module is for pacing transmission of the network packets by distributing the network packets over an interval created by removal of the encoded video frames.

21. The filter of claim 16, wherein the encoded video frames are encoded according to a hierarchy, and wherein the adaptive frame removal module is for progressively removing encoded video frames of an increasingly higher order in the hierarchy.

22. A network for transmitting a synchronized video and audio stream, comprising:
a video server; and
a filter in communication with the video server, wherein the filter includes:
a layer detection module for detecting encoded video frames in a synchronized video and audio stream transmitted by the video server;
an adaptive frame removal module in communication with the decoding module for removing certain of the encoded video frames in the stream based on a bandwidth condition of the network; and
a network packetizing and pacing module in communication with the adaptive frame removal module for packetizing the stream into network packets and pacing transmission of the packets over the network, wherein one of the packets includes information regarding the frame removal rate of the adaptive frame removal module.

23. The network of claim 22, wherein the video server is for transmitting the stream to a receiver via the filter, and wherein the receiver communicates the bandwidth condition of the network to the filter.

24. The network of claim 22, wherein the filter is co-located with the server.

25. A network, comprising:
a video server for transmitting a synchronized video and audio stream to a receiver;
a first filter in communication with the video server; and
a second filter in communication with the first filter, and wherein the first and second filters each include;
a layer detection module for detecting encoded video frames in the stream;
an adaptive frame removal module in communication with the decoding module for removing certain of the encoded video frames in the stream based on a bandwidth condition of the network; and
a network packetizing and pacing module in communication with the adaptive frame removal module for packetizing the stream into network packets and pacing transmission of the packets over the network; and
wherein the receiver communicates a first bandwidth condition of the network to the second filter and the second filter communicates a second bandwidth condition of the network to the first filter.

26. A network, comprising:
a video server for transmitting a synchronized video and audio stream;
means for detecting encoded video frames in the stream;
means for adaptively removing certain of the encoded video frames based on a bandwidth condition of the network; and
means for packetizing the modified stream into network packets and pacing transmission of the packets over the network, wherein one of the packets includes information regarding the frame removal rate of the means for adaptively removing certain of the encoded video frames.

27. A computer-readable medium having stored thereon instructions, which when executed by a processor, cause the processor to:
detect encoded video frames in a synchronized video and audio stream;
remove certain of the encoded video frames based on a frame removal rate of a packet-switched network over which the stream is to be transmitted;
packetize the modified stream into network packets; and
transmit the packets to a receiver, wherein one of the packets includes information regarding the frame removal rate.

28. The computer-readable medium of claim 27, having further stored thereon instructions, which when executed by the processor, cause the processor to transmit the network packets over the network, wherein the packets are distributed over an interval created by removal of the encoded video frames.

29. The computer-readable medium of claim 27, having further stored thereon instructions, which when executed by the processor, cause the processor to detect encoded video frames in the stream by detecting a structure of all layers of the stream without demultiplexing and decoding of the stream.

30. The computer-readable medium of claim 27, having further stored thereon instructions, which when executed by the processor, cause the processor to detect encoded video frames by analyzing bits in the stream to identify patterns indicative of a current position in the stream relative to other layers in the stream.

31. The computer-readable medium of claim 27, having further stored thereon instructions, which when executed by the processor, cause the processor to detect I-frames, P-frames, and B-frames in an MPEG system stream.

32. A method for adaptively modifying a bit rate of a synchronized video and audio stream in real-time, comprising:

detecting encoded video frames in the stream;

removing certain of the encoded video frames from the stream based on a frame removal rate of a packet-switched network over which the stream is to be transmitted;

packetizing the modified stream into network packets; and transmitting the packets to a receiver, wherein one of the packets includes information regarding the frame removal rate.

33. The method of claim 32, further comprising pacing transmission of the network packets.

34. The method of claim 33, wherein pacing includes distributing the network packets over an interval created by removal of the encoded video frames.

35. The method of claim 32, wherein detecting includes detecting encoded video frames in the stream by detecting a structure of all layers of the stream without demultiplexing and decoding of the stream.

36. The method of claim 32, wherein detecting includes detecting encoded video frames in the stream by analyzing bits in the stream to identify patterns indicative of a current position in the stream relative to other layers in the stream.

37. The method of claim 32, wherein the video frames are encoded according to a hierarchy, and wherein removing includes progressively removing certain encoded video frames of an increasingly higher order in the hierarchy.

38. The method of claim 32, further comprising receiving information regarding the bandwidth condition of the network from a receiver of the packetized stream.

39. The method of claim 38, further comprising communicating information to the receiver regarding a frame removal rate.

40. The method of claim 32, wherein detecting includes detecting I-frames, P-frames, and B-frames of an MPEG system stream.

* * * * *

UNITED STATES PATENT AND TRADEMARK OFFICE
CERTIFICATE OF CORRECTION

PATENT NO. : 6,747,991 B1
DATED : June 8, 2004
INVENTOR(S) : Hemy et al.

It is certified that error appears in the above-identified patent and that said Letters Patent is hereby corrected as shown below:

Title page,
Item [73], Assignee, delete "Pittsburg" and substitute therefor -- Pittsburgh --.

Column 1,
Line 41, delete "bitstreams" and substitute therefor -- bitstreams --.

Column 3,
Line 66, delete "interceding" and substitute therefor -- intercoding --.

Column 4,
Line 12, delete "number frames" and substitute therefor -- number of frames --.
Line 23, delete "steam" and substitute therefor -- stream --.

Column 7,
Line 18, delete "interceding" and substitute therefor -- intercoding --.

Column 8,
Line 63, delete "interceding" and substitute therefor -- intercoding --.

Column 9,
Line 13, delete "it determined" and substitute therefor -- it is determined --.

Column 11,
Line 37, delete "that" and substitute therefor -- than --.
Line 54, delete "continuous adaptively" and substitute therefor -- continuous adaptivity --.
Line 55, delete "condition" and substitute therefor -- conditions --.

UNITED STATES PATENT AND TRADEMARK OFFICE
CERTIFICATE OF CORRECTION

PATENT NO. : 6,747,991 B1
DATED : June 8, 2004
INVENTOR(S) : Hemy et al.

It is certified that error appears in the above-identified patent and that said Letters Patent is hereby corrected as shown below:

Column 14,
Line 36, delete "the modified stream" and substitute therefor -- the stream --.

Signed and Sealed this

Twenty-eighth Day of June, 2005

JON W. DUDAS
*Director of the United States Patent and Trademark Office*